United States Patent [19]

Smith

[11] Patent Number: 4,860,089
[45] Date of Patent: Aug. 22, 1989

[54] APPARATUS AND METHOD FOR TRACKING THE SUBCARRIER TO HORIZONTAL SYNC OF A COLOR TELEVISION SIGNAL

[75] Inventor: Terrance Smith, Redwood City, Calif.

[73] Assignee: Ampex Corporation, Redwood City, Calif.

[21] Appl. No.: 36,647

[22] Filed: Apr. 10, 1987

[51] Int. Cl.$^4$ .................. H04N 17/02; H04N 9/45
[52] U.S. Cl. .................................. 358/10; 358/19; 358/325; 358/326
[58] Field of Search ............... 358/19, 17, 139, 10, 358/326, 325

[56] References Cited

U.S. PATENT DOCUMENTS

| | | | |
|---|---|---|---|
| 4,052,733 | 10/1977 | Derenbecher, Jr. | 358/10 |
| 4,313,129 | 1/1982 | Fukui | 358/325 X |
| 4,468,709 | 8/1984 | Kenjyo | 358/325 X |
| 4,562,457 | 12/1985 | Salvia | 358/19 |
| 4,647,984 | 3/1987 | Suzuki et al. | 358/326 |
| 4,675,724 | 6/1987 | Wagner | 358/19 |

Primary Examiner—James J. Groody
Assistant Examiner—Victor R. Kostak
Attorney, Agent, or Firm—William A. Marvin; George B. Almeida; Richard P. Lange

[57] ABSTRACT

Tracking of a standard or non-standard input video signal, such as a NTSC or PAL composite video signal, is provided by supplying the phase difference between a horizontally-related subcarrier signal, and a variable horizontal sync signal, which is indicative of the SCH phase shift in the input video signal. The phase difference is used to generate a corresponding servo voltage, which then is used to steer the bias of a monostable and thus vary accordingly the trailing edge of a pulse generated thereby, to remove the phase difference. Thus the variable horizontal sync signal is made to coincide with the subcarrier signal, which forces the system to track the subcarrier-to-horizontal sync phase of the input video signal.

34 Claims, 7 Drawing Sheets

APPARATUS AND METHOD FOR TRACKING THE SUBCARRIER TO HORIZONTAL SYNC OF A COLOR TELEVISION SIGNAL

The invention relates generally to the measurement of the input phase of the subcarrier to horizontal synchronizing pulses of a color television signal and, more particularly, to using the measured phase signal to indicate whether the input video signal is a standard or non-standard signal when in a measurement mode of operation, while further tracking the input phase of the subcarrier to horizontal synchronizing pulses when in a tracking mode of operation.

An analog color television (video) signal is comprised of a plurality of components including a luminance component, chrominance component, subcarrier component, burst component, and horizontal and vertical blanking and synchronizing (sync) pulses. For an NTSC standard color video signal, the horizontal line rate is 15.75 kHz with a subcarrier frequency of approximately 3.58 MHz. This means that defined in terms of the subcarrier frequency, the horizontal line rate is 455/2 subcarrier cycles per horizontal line. The horizontal blanking pulses, which provide a time period for retrace of the video signal, occur at the horizontal line rate and separate the video signals containing the luminance and chrominance components from the video signals containing the burst component and sync pulses, for each horizontal line. The horizontal sync pulses are positioned on the blanking pulses and occur a fixed time period after the start of the blanking pulse. A color burst waveform containing a plurality of phased unmodulated cycles of a sine waveform at the subcarrier frequency is disposed on the "back porch" or pedestal of the blanking pulse.

The color burst waveform is usually defined, for a standard signal, to be in phase with the 50% amplitude point of the leading edge of the associated horizontal sync pulse, and to start a defined number of subcarrier cycles following the horizontal sync pulse.

However, the burst waveform may not be generated exactly in phase with the sync pulses, as there will always be some error in the formation of, for example, a composite or a component video signal waveform. Additionally, other non-standard sources of composite or component video signals may, for their own purposes, offset the subcarrier burst from the leading edge of the horizontal sync pulse. This offset, either because of the generation of the video signal from a non-standard source, or errors in the formation of a video signal from a standard source, are measured in degrees of the subcarrier cycles and are termed the subcarrier to horizontal synchronizing pulse phase, or more simply, SCH phase. The SCH phase measurement is important because in such video equipment as magnetic tape recording and reproducing equipment and video time base correctors, this parameter can be used to determine field and frame information. Further, the parameter may be used as a means for determining the precise beginning of active video for each horizontal line after the blanking pulse.

An operator of such video equipment desires to know whether the input composite video signal is standard or non-standard so that one video signal may be integrated with another without causing horizontal picture shift. One of the most prevalent standards, RS 170A, promulgated by the Electrical Industries Association, states that a video signal is standard if the SCH phase is within $\pm 40°$ of coincidence relative to the horizontal sync pulses. It is relatively difficult, however, to measure the SCH phase as the waveforms are at high frequencies and the phase difference may be relatively small compared to one subcarrier cycle. The measurement problem occurs because the burst signal can be noisy and the leading edge of horizontal sync pulse is difficult to measure within $\pm 1$ nanosecond, which is many degrees of a subcarrier cycle.

To determine whether the SCH phase is a RS 170A standard signal, typical prior art circuits measure the SCH phase by comparing the phase of subcarrier to a fixed reference voltage, that is, to a window corresponding to the standard. The results of the comparison then generally are used in typical video tape recorders and time base correctors for providing an operator with a visual display which indicates that the input video signal is within the window. For example, in the standard RS 170A, if the input video signal SCH phase is within $\pm 40°$ of coincidence with the horizontal sync pulses it is displayed as a standard RS 170A video signal.

In the past, relatively complex analog circuits including tuned circuits and complex filtering devices were used to measure this parameter. These analog circuits tended to drift and required periodic tuning or adjustment to maintain their measurement precision. In addition, such circuits require resetting if the operator chooses to operate with a value of SCH phase other than that of the RS 170A standard, which is a relatively common requirement, particularly in large video facilities with numerous and different video apparatus.

It follows that it is extremely difficult to provide mixing or switching between video inputs which have unknown SCH phases and which, accordingly, probably are different from one another. One example of a video system having video signals of unknown SCH phases is one in which video signals to be mixed are generated by a number of video cameras, each of which typically may have a random and thus unknown SCH phase output.

In addition, prior art circuits for measuring SCH phase typically are capable of handling only relatively small drifts of SCH phase within the usual limits, for example, of $\pm 90°$. It follows that problems occur when the SCH phase is close to the limit whereby a small drift causes the SCH phase to cross the limit which, in turn, allows the frame information to change. The drift may be only a few degrees and thus the system may drift back over the limit, thus causing the frame information to change again. Such changing of frame information causes a horizontal shift of a subcarrier cycle in the picture. In a time base corrector, this shift will be horizontal and may be conditional depending on drift. In a digital video tape recorder, this shift is recorded on tape and the horizontal shift will occur every time the tape is played back because of the change in frame information.

Accordingly, it would be highly desirable to provide an SCH phase measurement system which does not require periodic tuning and adjustment, which is not affected by analog drift and noise problems and/or by small drifts in SCH phase about the $\pm 90°$ phase change limits.

SUMMARY OF THE INVENTION

The invention overcomes the problems and shortcomings of the prior circuits of previous discussion, by providing a method and apparatus for accurately measuring the SCH phase of a color video signal, while further providing for tracking the SCH phase of an input video signal. The measurement is made by digital measurement techniques and, therefore, requires no tuned circuits or component adjustments, wherein accordingly, the measurement accuracy is not degraded by aging or changing component values.

In the preferred implementation, the invention includes circuitry which, in a measurement mode of operation measures the SCH phase via a measurement servo loop, and which, then reverts to a tracking mode of operation using a tracking servo loop to track the SCH phase of the input video signal regardless of whether the signal is standard or non-standard SCH phase. When in either operating mode, the SCH phase measurement may be read out as a digital number such that the video equipment utilizing the apparatus can store, display, or further process the value. Means are provided for comparing the measured SCH phase against a standard RS 170A range window and for supplying an indication to an operator whether the phase is standard or not. In addition, the invention includes means to supply a digital number from an outside source which establishes another calibration point for the tracking servo to operate on, as when a facility has video apparatus which operates on non-standard SCH phase.

In the tracking mode, the measured SCH phase of the input video signal is used to generate a control signal which servos the tracking servo loop to cause the circuit to track or follow the input SCH phase even if it is non-standard. Thus, the input SCH phase may be used as a standard whereby the control signal steers the servo loop to track the changing input phase. In this mode, the tracking servo loop is servoed to the "center" of the standard, or non-standard, SCH phase window and then is maintained at the selected center by the phase tracking servo. In the non-standard, the "center" is shifted a selected angle from true center, to match the non-standard SCH phase of the associated facility video apparatus. Thus, unlike prior art circuits, the invention prevents small shifts in phase from approaching the limits and thus minimizes the possibility of potential changes of frame information because of input signal SCH phase drift. Further, when using an associated digital recorder, with the present circuit in the tracking mode, the horizontal picture position in playback will move, that is, will shift with a shifting input SCH phase over a relatively large amount, but it will not have any horizontal resets of the picture positions.

In addition, the invention provides means for resetting the SCH phase of the input signal if it drifts more than on the order of two subcarrier cycles from standard SCH phase, for example, ±360° or more away from the standard. When such conditions occur, as when switching from one non-standard phase camera to another non-standard phase camera on different fields, or when receiving an asynchronous signal, the framing information will be corrected.

These and other objects, features, and aspects of the invention will become apparent upon reading the following detailed description in conjunction with the attached drawings wherein:

DESCRIPTION OF THE PREFERRED EMBODIMENTS

Figure 1:
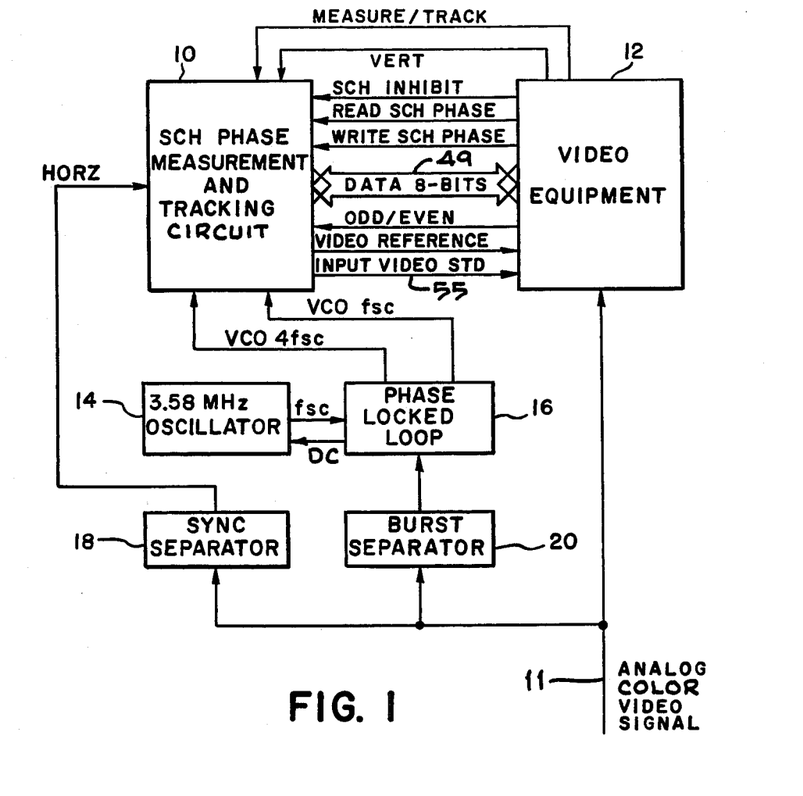
FIG. 1 is a system block diagram of a SCH phase measurement and tracking circuit in accordance with the invention in a video equipment environment.

FIG. 1 illustrates a SCH phase measurement/tracking tracking circuit 10 in the environment of video equipment 12, in accordance with the invention. The SCH phase measurement/tracking circuit is used by video equipment 12 to measure the SCH phase of an analog color video signal and/or to track that phase, as determined by a signal MEASURE/TRACK from the equipment 12. The video equipment 12 may be a digital video tape recording and reproducing apparatus, time base corrector, special effects processor, or the like.

Although the invention is described herein in the environment of a NTSC color television standard system employing a composite color video signal, it is to be understood that the invention contemplates application in other color television standard systems, such as PAL, and may be used with a component color video signal as well, as further discussed below.

When in either the measurement or the tracking mode, the SCH phase measurement/tracking circuit 10 can transfer a digital word to the video equipment 12 via a system data bus 49, when requested by a signal READ SCH PHASE for subsequent display, etc., by associated video apparatus. Further, the video equipment 12 can write a digital word to the SCH phase measurement/tracking circuit 10 over the system data bus 49 in response to a WRITE SCH PHASE signal, to set a non-standard reference phase for the circuit. A VERT signal is supplied from the video equipment 12 to clock data into and out of the system data bus 49 only during the vertical blanking interval so as not to disturb the video picture, and is further described below.

When the video equipment 12 determines that the analog color video signal is not a color signal but is monochromatic, it produces a SCH INHIBIT signal which disables the tracking and measurement modes of the circuit 10, since a black and write video signal has no SCH phase. The video equipment determines the field/frame changes from the analog color video signal and supplies an ODD/EVEN signal to the SCH phase measurement/tracking circuit 10 to provide a timing signal which changes every 525 horizontal lines. In addition, the circuit 10 provides an INPUT VIDEO STD signal which is displayed to indicate whether the input analog color video signal is within the range of the RS 170A standard, that is, is within a ±40° window of the actual SCH phase in the tracking mode. Finally, the circuit 10 further generates a VIDEO REFERENCE signal for the video equipment 12, which is a timing signal which occurs a fixed reference time period after horizontal sync in the measurement mode, and which is a moveable reference depending upon the changing SCH phase in the tracking mode.

Three timing signals are developed from an analog composite video signal supplied on an input video signal line 11, to provide synchronizing signals for the SCH phase measurement/tracking circuit 10. These signals are pulses at the horizontal sync rate termed a HORZ signal, and two clocking signals VCO fsc and VCO 4fsc, which are supplied at the subcarrier frequency and four times the subcarrier frequency, respectively, by a phase locked loop 16. The HORZ signal is developed from the analog color video signal by passing the video signal through a sync separator 18. The sync separator is a level detector which separates the horizontal sync pulses from the video input signal to provide the horizontal sync signal hereinafter termed the HORZ signal. The clocking signals VCO fsc and VCO 4fsc are supplied to circuit 10 from the phase locked loop 16, which receives at one input, an oscillator signal at frequency fsc from a crystal voltage controlled 3.58 MHz oscillator 14.

The analog composite video signal additionally is fed from input line 11 through a burst separator 20, which detects the burst waveform and separates it from the other parts of the analog composite signal. The burst waveform then is used as a phase reference to the phase locked loop 16 such that the frequency fsc is phase locked to burst. The VCO 4fsc signal is generated from the VCO fsc signal by a 4X ringer circuit and thus keeps the same phase as the fsc signal. The generation of these clocking signals HORZ, VCO fsc, and VCO 4fsc may be independent of the video equipment 12 or may be from circuitry contained therein. Preferably, because many of the circuits of the video equipment 12 will use similar signals, these clocking signals can be generated from the video equipment 12 in generally conventional fashion, and then supplied to the sync phase measurement/tracking circuit 10. They have been shown as independently generated to clearly illustrate their origin.

Figure 2:
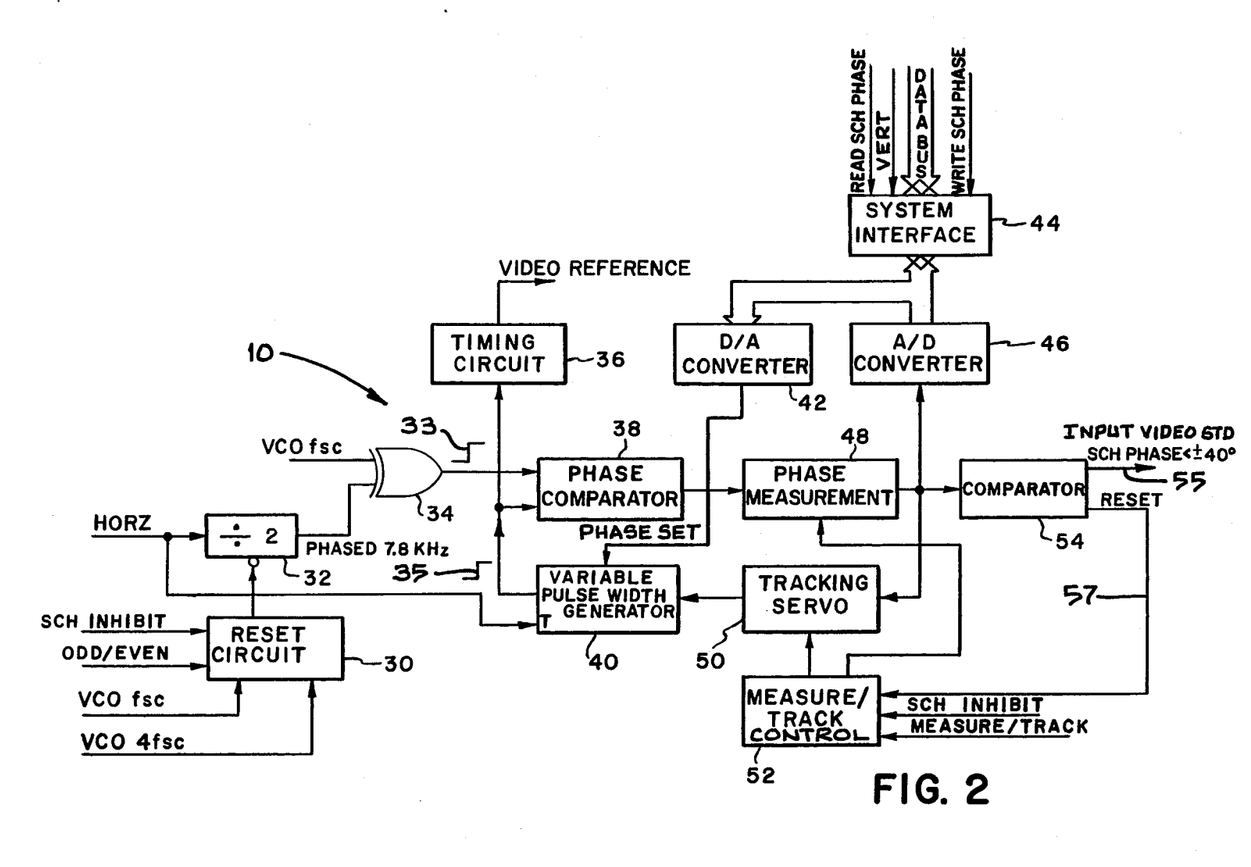
FIG. 2 is a block diagram of the SCH phase measurement and tracking circuit illustrated in FIG. 1.

In FIG. 2 a more detailed block diagram of the SCH phase measurement/tracking circuit 10 is illustrated, wherein similar components are similarly numbered. A basic component of the circuit is a phase comparator 38 which receives a square wave input from an exclusive OR gate 34 and a pulse input from a variable pulse width generator 40. The output of the exclusive OR gate 34 is a square wave at the subcarrier frequency fsc, phased by a 7.8 kHz signal from a divide-by-2 circuit 32. Circuit 32 receives the horizontal sync signal, HORZ, of previous mention. In addition, the circuit 22 receives a reset signal from a reset circuit 30 which, in turn, is supplied with the timing signals VCO fsc and VCO 4fsc, and the control signals SCH INHIBIT and ODD/EVEN, of previous mention in FIG. 1, and which are further discussed in FIG. 6 below. The phased 7.8 kHz signal combined with the signal VCO fsc, which is locked to burst, generates a positive going edge 33 at the output of exclusive OR gate 34 which is a horizontally-related subcarrier (fsc) signal or, termed more simply hereinafter, a "H-related subcarrier" signal.

The variable pulse width generator 40, which includes a monostable or one-shot (FIG. 8), is triggered into an unstable state by the HORZ signal. The generator 40 has a variable bias network which can be calibrated to set the width or time duration of the pulse, after the leading edge of the horizontal sync pulse is applied. After the elapse of the pulse width duration determined by the selectable bias supplied by the servo, the generator returns to its stable state and generates the trailing edge of the pulse. This trailing edge is inverted and applied as a positive going edge 35 to the phase comparator 38. The edge 35 thus is a delayed input horizontal sync signal or, termed more simply hereinafter, a "variable H sync" signal. The phase comparator 38 then compares the two edges 33 and 35 and supplies a pulse width signal to the phase measurement circuit 48 which is indicative of the phase difference between the variable H sync signal from the variable pulse width generator 40, and the H-related subcarrier signal from the exclusive OR gate 34.

The phase measurement circuit 48 receives the pulse width signal and transforms it into a DC voltage signal proportional to the phase or time difference of the compared signals. This DC voltage then is supplied back to the monostable of the variable pulse width generator 40 via the servo loop, to steer the variable bias network commensurate with the measured SCH phase difference. In addition, the DC voltage signal is compared with a threshold value in a comparator 54, which produces the INPUT VIDEO STD signal if the phase difference is not greater than the RS 170A standard window of ±40°. The signal is supplied to the video equipment 12 and displayed as a visual indication of whether the input signal phase is standard or non-standard. Thus, if the variable pulse width generator 40 generates its tracking edge with reference to the coincidence of horizontal sync, then the INPUT VIDEO STD signal will indicate whether the SCH phase is within the limits of a RS 170A standard of ±40%, on an output line 55. Further, for determining whether to cause a reset of the tracking mode, the comparator 54 has a range of approximately ±360° of subcarrier cycle. If the phase measurement falls outside the limits of this range, a RESET signal is generated on a line 57 to reset the entire circuit and the SCH phase.

The DC voltage signal from the phase measurement circuit 48, indicative of the phase difference, also is used in a tracking servo 50 to develop a signal which provides the previously mentioned change in the pulse width of the variable pulse width generator 40 and thus the timing of the edge 35, when the system is in the tracking mode. If the pulse edge 35 of generator 40 lags the VCO fsc positive going edge 33, then the pulse width generator 40 is biased to cause the trailing edge of the pulse to occur sooner and thereby advance the edge 35. Conversely, if the edge 35 of the generator 40 leads the positive going edge 33 of the VCO fsc signal, the bias of the generator is changed to retard the trailing edge 35 until it matches the VCO fsc edge. Thus, the positive going edge 35 of a pulse from the variable pulse width generator 40 is steered by the servo to follow the VCO fsc edge 33, and thus is forced to track the phase of the subcarrier to horizontal sync pulses of the input video signal.

The pulse edge 35 from the variable pulse width generator 40 also is applied to a timing circuit 36 which generates the VIDEO REFERENCE (REF) signal. The VIDEO REF signal is a timing, or write, signal which, in the measurement mode, occurs a fixed duration after the leading edge of the horizontal sync pulses. In the tracking mode, in accordance with the invention circuit, the VIDEO REF signal is phased to the subcarrier and SCH phase and occurs a variable duration after the horizontal sync pulses. Thus, when tracking, the VIDEO REF signal moves with the edge 35 from the variable pulse width generator 40, as the latter moves to follow the drifting input SCH phase. The VIDEO REF signal is used in associated video apparatus such as depicted as video equipment 12 in FIG. 1. For example, VIDEO REF is used as a write signal to identify the start of the active video portion of a horizontal line when operating a video recorder in the record mode, to load the first sample into a memory of a time base corrector, etc.

The phase measurement circuit 48 and the tracking servo 50 are selectively switched between the open and closed states when operating in the measurement mode, the tracking mode, and/or when a circuit reset is required, in response to a measure/track control circuit 52. The circuit 52, in turn, receives the mode signal MEASURE/TRACK and the SCH INHIBIT signal (color or monochrome) generally from the video equipment 12, as depicted in FIG. 1. Normally, for a monochrome signal there is no need to track SCH phase because the signal contains no subcarrier component. Therefore, the SCH INHIBIT signal causes the measure/track control circuit 52 to revert to the measurement mode. Further, the RESET signal on line 57 from the comparator 54 will cause a momentary pulse of selected duration which switches the phase measurement circuit 48 and the tracking servo 50 back into the measurement mode, such that a zero reference value is used to begin a tracking cycle. The RESET signal thus is generated on initial circuit turn-on, as well as any time during the operation of the present circuit that the servo loop is lost or when the SCH phase of the input video signal shifts beyond the bounds, that is, beyond the $\pm 360°$ limits.

FIG. 2 further includes a system interface circuit 44, a digital-to-analog converter (D/A) 42, and an analog-to-digital converter (A/D) 46, which comprise a system data interface which cooperates within the present circuit 10 and the associated video equipment 12. The A/D 46 receives the DC voltage signal, which is representative of the SCH phase, from the phase measurement circuit 48, converts this analog voltage into a digital number, and transfers it to the system interface 44. The video equipment 12 supplies the READ SCH PHASE signal of previous mention in FIG. 1, to the system interface 44 to place the digital value on the data bus 49 in response to the VERT signal, from where it can be read into storage for use in, for example, a suitable display device in an associated video apparatus.

Conversely, the video equipment 12 may write a digital value into the system interface 44 by placing the value on the data bus 49 and generating the WRITE SCH PHASE signal of mention in FIG. 1, to transfer the digital value to the D/A 42 in response to the VERT signal. The D/A 42 converts the digital value to an analog voltage, which then is applied to steer the previously mentioned bias network of the variable pulse width generator 40. The voltage from the D/A 42 thus is used as a control voltage to vary the bias point of the pulse width generator 40, and thus the position of edge 35, such that a different fixed value for the reference is generated. In this manner, an operator of the video equipment 12 in a large facility, having video apparatus with non-standard SCH phase, may set any desired SCH phase into the circuit, rather than maintain a RS 170A standard. The circuit then tracks the non-standard SCH phase of the input video signal when switched to the tracking mode.

Figure 3:
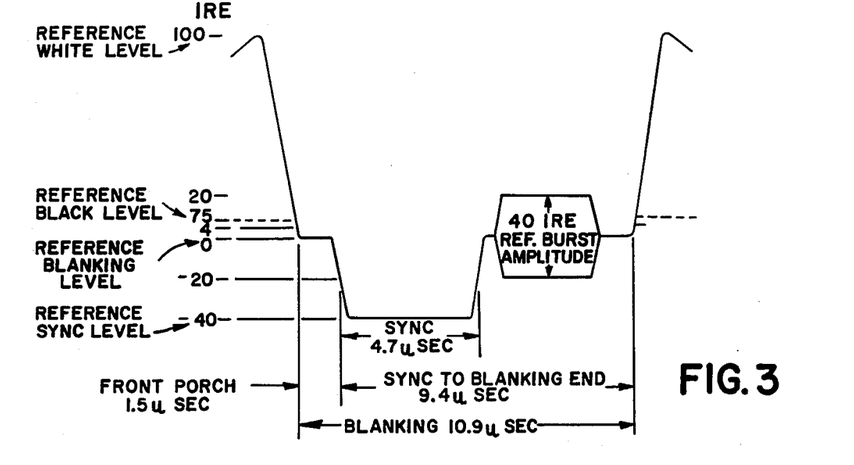
FIG. 3 is a waveform diagram of the horizontal blanking interval of a composite video signal.
Figure 4:
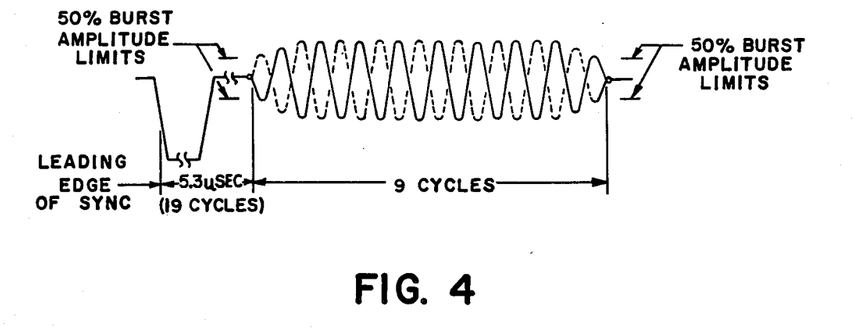
FIG. 4 is a waveform diagram of the burst waveform of the horizontal blanking pulse illustrated in FIG. 3.
Figure 5:
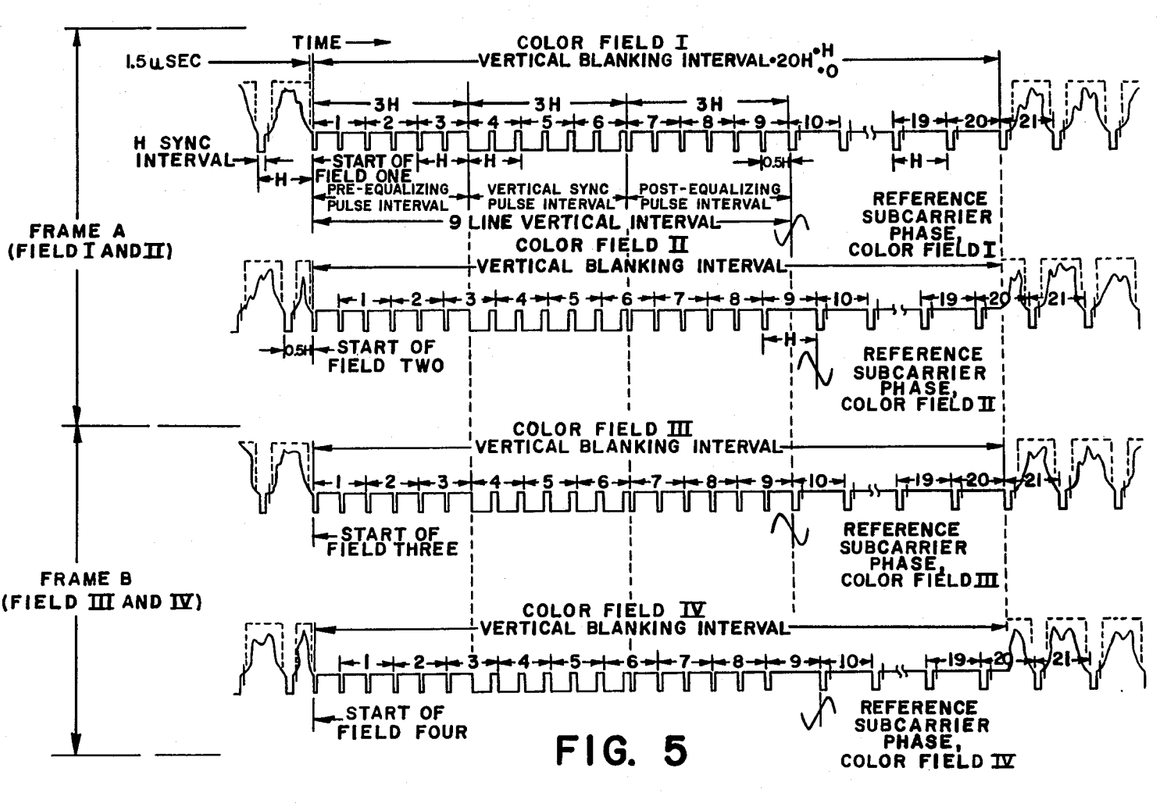
FIG. 5 is a series of waveforms illustrating the format of an analog color composite video signal including frame A and frame B, and the reference subcarrier phase for color fields I, II, III and IV.

By way of background, FIGS. 3, 4, and 5 illustrate the generally conventional relationships in, for example, a NTSC color television standard system, of the horizontal sync pulses relative to the phase of the burst waveform, or reference subcarrier, for a composite color video signal. FIG. 5 illustrates that a composite color video signal is formed of two frames, A and B, each having two fields. The odd fields I and III include a reference subcarrier which, if unmodulated, is at 0° phase, and the even fields II and IV have a reference subcarrier 180° out of phase with the previous field.

The reference subcarrier is represented by a burst waveform of approximately nine cycles, with a frequency equivalent to that of fsc or 3.58 MHz in the NTSC standard, and is illustrated in FIGS. 3 and 4. The burst waveform is positioned on the back porch of the horizontal blanking pulse which initiates every horizontal line. The back porch of the horizontal blanking pulse in turn follows the horizontal sync pulse, which is at a reference blanking level of 0 IRE units in amplitude, with the color white being 100 IRE units.

The burst signal has a positive and negative going amplitude of 40 IRE units centered on the reference blanking level or pedestal value on the back porch. The phase of the burst waveform is measured from the first zero crossing after an interval of 5.3 microseconds from the leading edge (50% amplitude point) of the horizontal sync pulse. The initial point of the burst waveform is approximately 19 subcarrier cycles after the leading edge of the horizontal sync pulse. The start of the burst waveform is defined by the zero crossing (positive or negative) that preceeds the first half cycle of subcarrier that is 50% or greater than the burst amplitude of 40 IRE units. The initial zero crossing of the burst is negative going on one horizontal line and positive going on the alternate horizontal line.

For standard signals, zero crossings of the reference subcarrier are nominally coincident with the 50% point of the leading edges of all horizontal sync pulses. For an RS 170A standard, as the relationship between the sync pulses and subcarrier waveform is critical for program integration, the tolerance on this coincidence is $\pm 40°$ of the reference subcarrier phase. It is the measurement of this phase angle between the leading edge of horizontal sync and the zero crossing of the subcarrier that is the measurement of SCH phase of interest herein.

Figure 6:
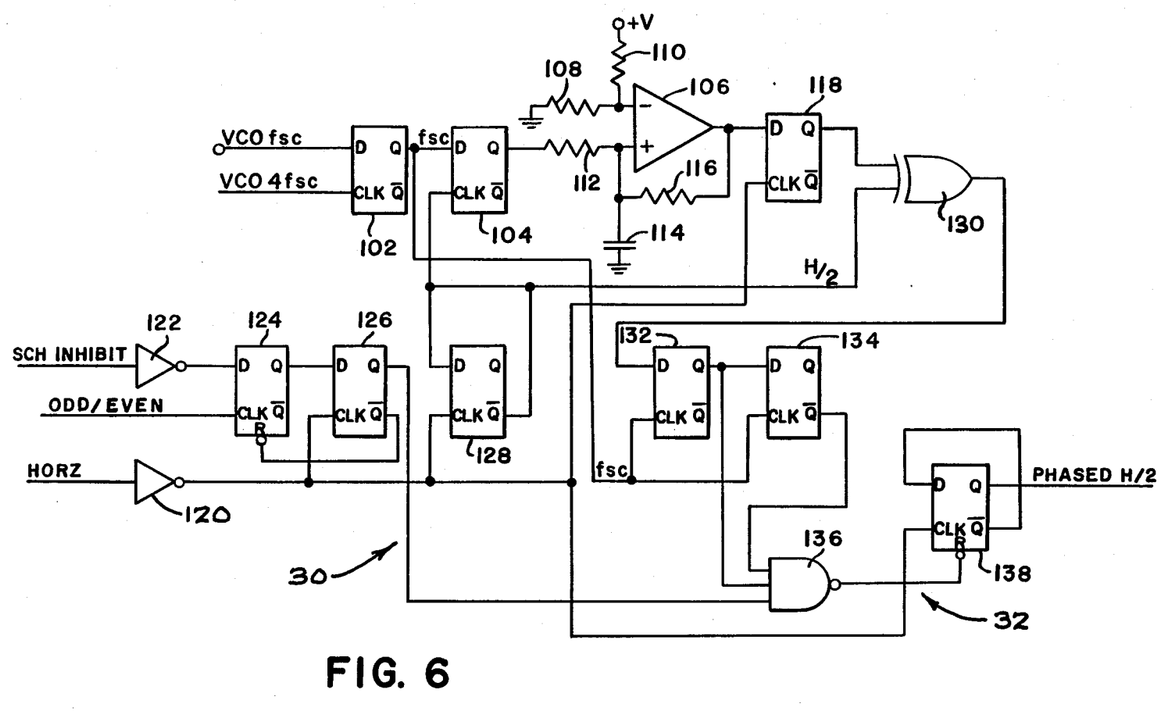
FIG. 6 is an electrical schematic of the reset and divide-by-2 circuitry illustrated in FIG. 2, for generating the phased 7.8 kHz signal.

In FIG. 6 there is illustrated by way of example, an electrical schematic exemplifying an implementation of circuitry used to generate a phased 7.8 kHz signal, previously discussed in the SCH phase measurement/tracking circuit 10 of FIGS. 1, 2. FIG. 6 includes circuitry of the reset circuit 30 and of the divide-by-2 circuit 32 of FIG. 2. The HORZ signal is used as a clock for a D-type bistable 128 after passing through an inverter 120. The bistable 128 has its *Q output (an asterisk is used hereinafter to denote the logical not-true state shown in the drawings) connected to its D input and, therefore, divides the 15.75 kHz horizontal signal into a periodic square wave signal with a frequency of 7.8 kHz. The HORZ signal further is supplied, via the inverter 120, as a clock signal to the CLK input of a D-type bistable 138, which corresponds to the divide-by-2 circuit 32 of FIG. 2. The bistable 138 has its *Q output connected to its D input and also divides the HORZ signal into a signal of frequency 7.8 kHz.

The bistable 138 is reset via an output signal of a NAND gate 136 which makes a transition to a low logic level in response to the coincidence of three signals. The first signal is the Q output of a D-type bistable 126, the second signal is the Q output of a D-type bistable 132 and the third signal is the *Q output of a D-type bistable 134. The output of the bistable 126 is a logical combination of the signals ODD/EVEN and SCH INHIBIT. The SCH INHIBIT signal is used to enable and disable the circuit depending upon whether the input video signal is monochrome or color. The circuit is not used for monochrome signals and, therefore, a high logic level SCH INHIBIT signal is used to disable the circuitry. The SCH INHIBIT signal is inverted in inverter 122 to become the input of a D-type bistable 124.

More particularly, the bistable 124 is clocked by the ODD/EVEN signal which is used to indicate the presence of either fields I and III (odd) or fields II and IV (even). If the SCH INHIBIT signal is a low logic level indicating a color video signal then, upon the clocking by the ODD/EVEN signal, bistable 124 will produce a high logic level on its Q output which is clocked through to the bistable 126. This high logic level output will enable one of the inputs of NAND gate 136, and forms one condition of the coincidence that is needed for the reset of bistable 138. The high logic level is clocked into the bistable 126 by the HORZ signal applied to its CLK input. The *Q output of bistable 126, when the Q output is set, causes a reset of bistable 124. The Q output of bistable 126 provides an enabling signal to the NAND gate 136 once every frame or 525 horizontal lines. The enabling signal is retimed such that its leading edge is coincident with the horizontal sync pulse for that line which causes the frame change.

The oscillator signal VCO fsc, which is in phase with the burst on each horizontal line, is retimed in a D-type bistable 102 by the VCO 4fsc signal to bring the two back into synchronism. The resulting fsc signal is applied from the bistable 102 to the D input of a bistable 104, which further is clocked by the 7.8 kHz signal from the *Q output of the bistable 128. By clocking the bistable 104 with the unphased 7.8 kHz signal, while applying the unmodulated subcarrier signal fsc to the D input of the bistable 104, a measurement pulse is generated from the Q output of bistable 104 every other horizontal line. This high or low output is related to the phase difference between the subcarrier signal and the horizontal signal, and is integrated in a capacitor 114 connected to the Q output of the bistable 104 through a resistor 112. The integration compensates for fluctuations between high and low logic levels as when the phase difference is near zero or 180°.

The capacitor 114 provides a voltage at the non-inverting input of an operational amplifier 106, which has its output connected to its non-inverting input through a hysteresis resistor 116. A threshold network includes resistors 108 and 110 connected between a positive source of voltage +V and ground, with the junction of the resistors tied to the inverting input of the operational amplifier 106 to provide a voltage thereto which is based on the voltage division of resistor 108 and resistor 110.

The operational amplifier 106 is configured as a non-inverting linear comparator amplifier with a threshold, wherein the voltage on capacitor 114 is compared with the threshold applied at the inverting input. The output of the operational amplifier 106 will be a high logic level when the voltage on capacitor 114 is greater than the threshold, and a low logic level when the voltage on the capacitor 114 is lower than the threshold. The Q output of bistable 104 is a high logic level when the subcarrier fsc leads with respect to the 7.8 kHz signal and a low logic level when it lags the 7.8 kHz signal. Operational amplifier 106 averages this measurement over several horizontal lines and provides a logical one or zero based on the difference. The operational amplifier 106 thus provides an averaging network for the phase difference between the subcarrier and the 7.8 kHz signal.

The output logic level of operational amplifier 106 is applied to the input of a D-type bistable 118 which is clocked by the H sync signal HORZ via the inverter 120. The Q output of bistable 118 is applied to one input of an exclusive OR gate 130, which receives the unphased 7.8 kHz signal from bistable 128 at its other input. The exclusive OR gate 130 produces a plus whose with is representative of the phase difference between the unphased 7.8 kHz signal and the phase difference between the subcarrier fsc and the 7.8 kHz signal.

The output from the exclusive OR gate 130 is applied to the D input of the bistable 132, whose Q output is applied to the D input of the bistable 134. Both bistables are clocked by the subcarrier signal fsc from bistable 102. The other two coincidence signals for resetting the bistable 138 are the Q output of the bistable 132 and the *Q output of the bistable 134, of previous mention. This circuit will produce a pulse, one fsc clock cycle in width, which makes a transition to a high logic level in coincidence with the transition of the exclusive OR gate 130 and makes a transition to a low logic level one fsc clock cycle later. The circuit, therefore, clocks a horizontally related signal from the output of the exclusive OR gate 130 to the closest fsc clock cycle. The output of NAND gate 136 is a reset pulse which is gated every 525 lines of the video signal.

Figure 7:
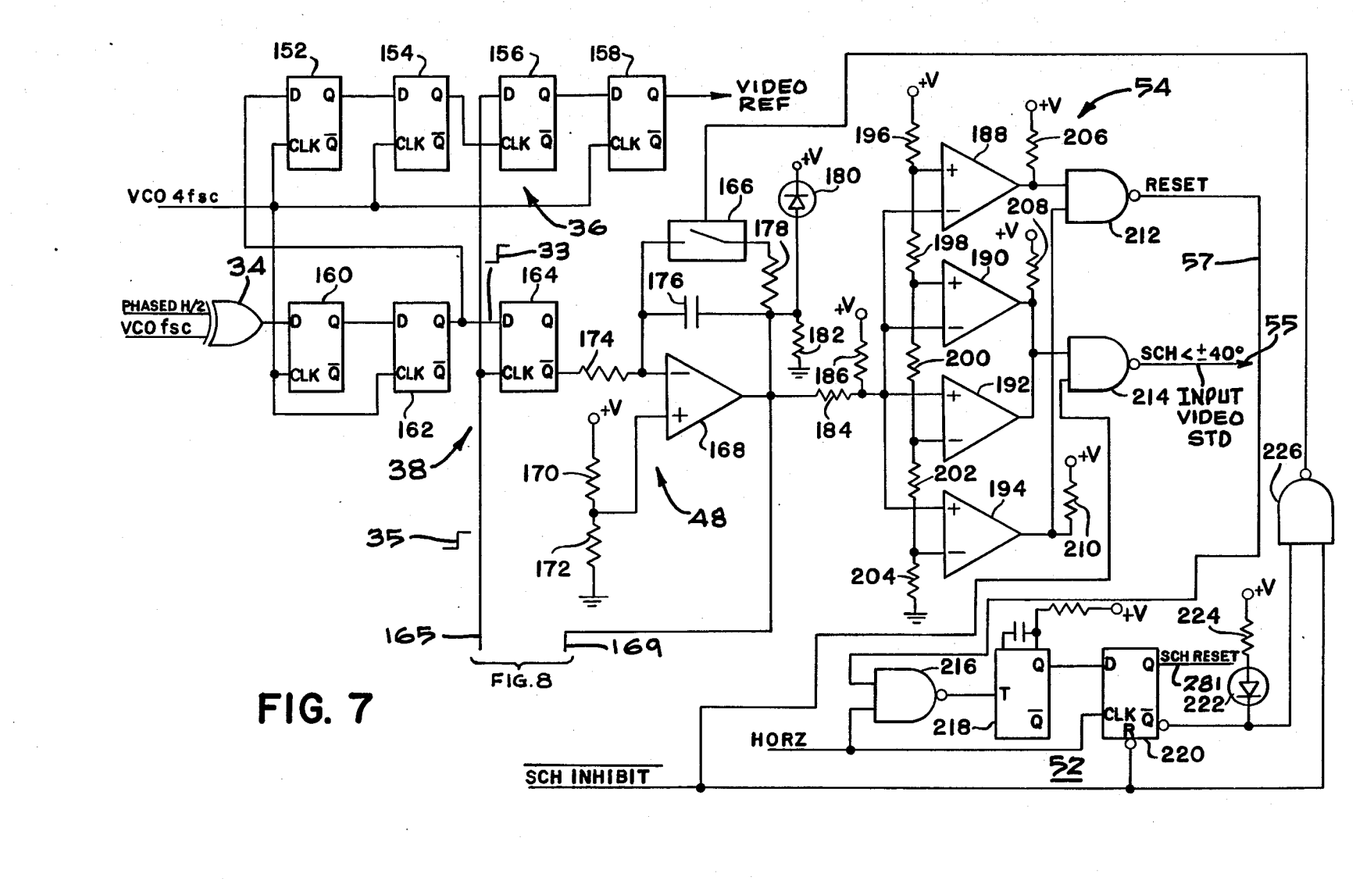
FIG. 7 is an electrical schematic of the timing circuit, the phase comparator, the phase measurement circuit, comparator, and a portion of the measure/track control circuit illustrated in FIG. 2.

The phased 7.8 kHz signal is used to provide a comparison signal with the VCO fsc signal, as more fully illustrated in FIG. 7. The two signals are phase compared in the exclusive OR gate 34 of previous mention in FIG. 2, and the output thereof is applied to the D input of a bistable 160. The Q output of bistable 160 is clocked through a following bistable 162 at a 4fsc rate to retime the signal. This action delays the phase difference between the phased 7.8 kHz signal and the VCO fsc signal one-half subcarrier cycle. The output of bistable 162 is applied to the D input of a bistable 164 which corresponds to the phase comparator 38 of FIG. 2. The bistable 164 has its CLK input tied via a line 165 to the output of a monostable 250 (FIG. 8) and thus is clocked at an H related rate which, however, is varied by the servo of the present circuit in accordance with the input signal SCH phase, as further described hereinbelow.

The *Q output of the monostable 250 also is applied via the line 165 to the D input of the bistable 156, which receives at its CLK input, the Q output of a bistable 154. The Q output of bistable 154 has been delayed two VCO 4fsc clock pulses via a bistable 152 and the bistable 154. This circuitry provides a pulse synchronous with the output of the exclusive OR gate 34 one fsc cycle later. This pulse is synchronized with the next VCO 4fsc clock pulse by transmitting it through a D-type bistable 158, which is clocked by the VCO 4fsc signal. As may be seen, the bistables 152-158 comprise the timing circuit 36 of FIG. 2. Accordingly, the Q output of the bistable 158 becomes the VIDEO REF signal of previous mention in FIG. 2, which is supplied to the associated video equipment 12. The VIDEO REF signal is used to identify the beginning of the active video in a horizontal line as when operating an associated video recorder in a record mode, or to identify the first sample when loading data into the memory of, for example, a time base corrector, etc. This VIDEO REF write signal accurately tracks the input video signal as further described in the following FIGURES.

In accordance with the invention, the intent is to steer the circuit servo so that the variable trailing edge 35 of horizontal sync and the positive going edge 33 of the H-related subcarrier signal occur in time coincidence. To this end, the circuit clocks on the bistable 164 which, however, will always be ambiguous; that is, its output is always ambiguous. On the other hand, the output of the bistable 156 is not ambiguous since it is driven by the same H-related subcarrier signal that's being delayed by 180°. Therefore, when the circuit servos properly, the variable H sync signal supplied to the bistable 164 will be ambiguous with 0° phase subcarrier and will not be ambiguous at the input to the bistable 156.

The *Q output of the bistable 164 is proportional to the phase difference between the fsc signal and the HORZ signal. The pulse width is integrated in a circuit comprising operational amplifier 168 and associated circuitry. The operational amplifier 168 has a threshold applied to its non-inverting input from the junction of a pair of resistors 170 and 172 which, in turn, are connected between a source of positive voltage +V and ground. The *Q output of the bistable 164 is fed to the inverting input of the operational amplifier 168 through a resistor 174. The operational amplifier has its inverting input tied to its output through a capacitor 176. In this configuration, the operational amplifier will integrate the signals applied to its inverting input which are above or below nominal TTL threshold voltage. A switch 166 and serial resistor 178 are coupled across the capacitor 176 and thus across the operational amplifier 168. The switch 166 is open in the tracking mode and in the measurement mode. But in the reset mode it is closed by a signal from the measure/track control circuit 52 thereby, in effect, disabling the amplifier 168 to allow resetting the circuit. A diode 180 and resistor 182 provide protection for the switch 166.

Figure 8:
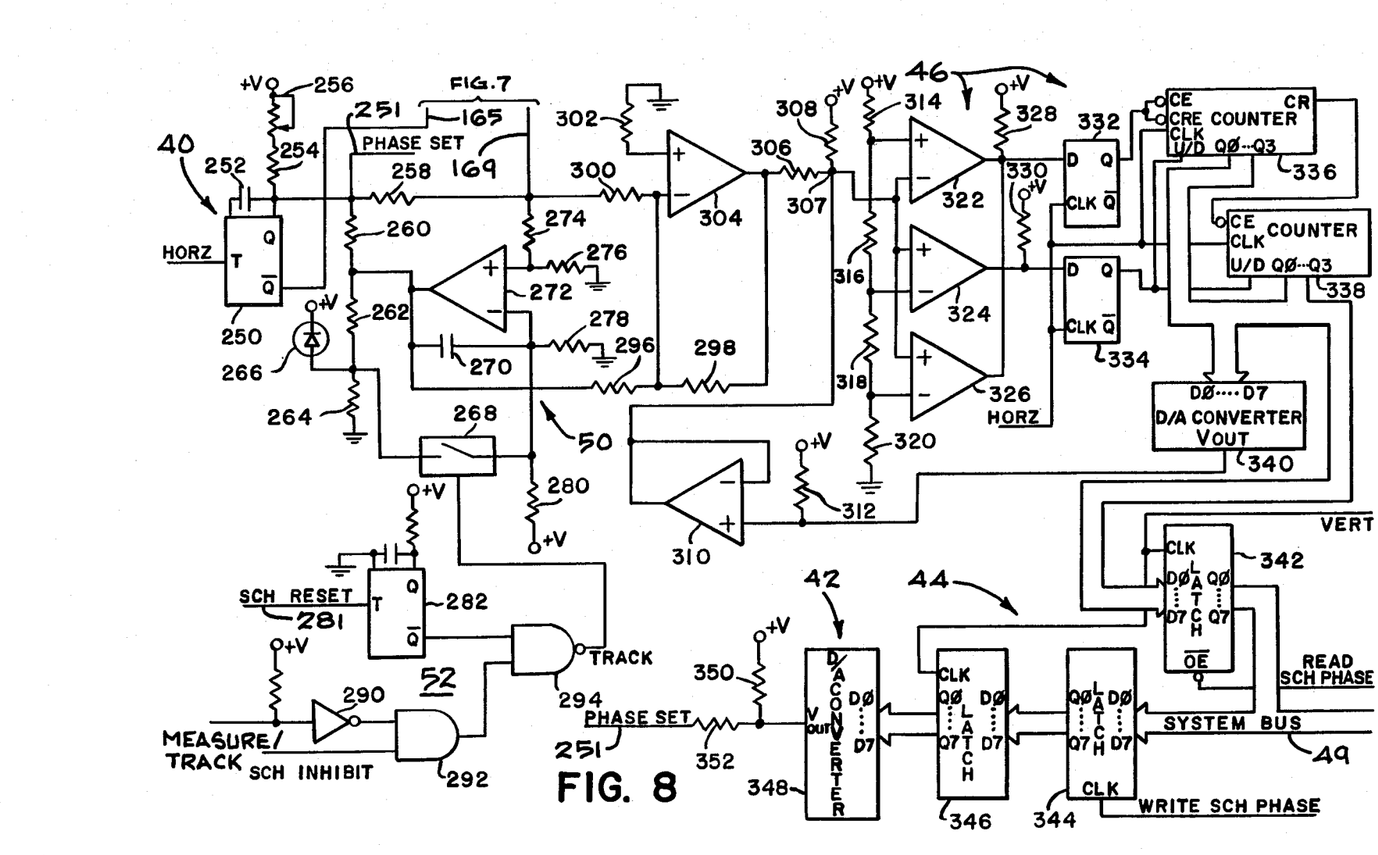
FIG. 8 is an electrical schematic of the variable pulse width generator, tracking servo, digi- tal-to-analog converter, analog-to-digital converter, system interface, and a portion of the measure/track control circuit illustrated in FIG. 2.

Referring also to FIG. 8, the phase difference from the integrating operational amplifier 168 is applied via a line 169 and a resistor 258 to the bias network of the monostable 250 to define, in essence, a measurement servo loop. The output voltage required to change the period of the monostable 250 has a known voltage transfer function which, in this example is 40° per volt. Since this transfer function for the phase difference voltage is known, and the value of the voltage required to center the SCH window also is known, it is only required to add an offset voltage to the monostable 250 which is equal to the measured phase difference, to enable the circuit to track the input signal SCH phase via the tracking servo further described below, in accordance with the invention.

With regards to the tracking mode, the phase difference also is applied via the line 169 to the non-inverting input of a servo amplifier 272 (FIG. 8) which implements the tracking servo function, through a junction 273 and a bias network including resistors 274 and 276. The resistors act as a voltage divider to apply a fractional amount of the voltage from the amplifier 168 to the tracking operational amplifier 272 via their junction. The operational amplifier 272 is configured as an inverting integrating amplifier having its inverting input tied to the junction of a capacitor 270 and a resistor 278 connected between its output and ground. A switch 268 is coupled via a resistor 262 across the capacitor 270, and thus across the tracking servo operational amplifier 272. The switch 268 is open in the tracking mode, and in the measurement or reset modes the switch is closed by a signal from the measure/track control circuit 52 which, in effect, disables the operational amplifier 272. A diode 266 and resistor 264 provide switch protection.

When the switch 268 is open and the tracking servo operational amplifier 272 is operative, the error voltage at the junction 273 of line 169 and the resistor 300 is servoed to the center of the SCH window ($\pm 40°$ in the standard SCH phase) which, in this example, is a known voltage of zero volts. Thus, depending on the value of the voltage at junction 273, the output of the operational amplifier 272 is driven in the direction and to a value which is required to bias the monostable 250 and correct for an SCH phase error, whether the monostable 250 is calibrated for standard or non-standard SCH phase.

The drive voltage from the servo amplifier 272, which comprises the tracking servo voltage, thus is applied via a resistor 260 to the bias network of the monostable 250 of previous mention, which implements the variable pulse width generator 40 (FIG. 2). The HORZ signal is applied to the T input of the monostable 250 and will trigger it into its unstable state. Depending upon the voltage supplied by the servo to the bias network, the trailing edge of the unstable state will occur a selected period of time later. To this end, the bias network of the monostable includes timing circuitry comprising a capacitor 252, a fixed resistor 254, and a variable resistor 256. The RC time constant of this timing circuitry provides a presettable calibration which allows the circuit to accept any SCH phase relationship, standard or non-standard. That is, the bias network variable resistor 256 allows setting the circuit, such as in a factory or in a video facility, to center the servo loop further discussed below on any subcarrier to horizontal sync phase relationship. The presettable timing of the trailing edge 35 (FIGS. 2,7) of the unstable state of the monostable 250 further may be calibrated by supplying a digital number from an outside source, as briefly discussed in FIG. 2 and further described below.

More particularly, in a further mode of operation, wherein the input signal phase reference is determined by application of a digital number from an outside source, the edge 35 further is calibrated by correspondingly changing the voltage of the PHASE SET signal of previous mention, and by applying this PHASE SET signal via a line 251 to the timing circuitry of the monostable 250, as further described below in FIG. 8.

An operational amplifier 304, which is configured as an inverting linear voltage amplifier, and which forms the input stage to circuitry which corresponds to the A/D 46 of FIG. 2, is driven in the measurement mode by the difference between the output of the amplifier 168 (FIG. 7) and the amplifier 272, and provides a voltage representative of that value to a junction 307 via an output resistor 306. The operational amplifier 304 has its non-inverting input referenced to ground through a resistor 302 and forms a differencing circuit by connecting resistors 300 and 296 together at its inverting input. A gain resistor 298 referenced to the two input resistors 300 and 296 provides a scaling of the error voltage signal. The resistor 300 drives the amplifier 304 in the measurement mode, while the resistor 296 drives the amplifier 304 in the tracking mode.

FIG. 8 depicts by way of example only, a specific implementation of the A/D 46. The voltage at junction 307, which is pulled up by a resistor 308 connected to a source of positive voltage +V, is servoed to a null in both modes of operation and is applied to the inputs of a set of range amplifiers 322, 324, and 326. The voltage is applied to the inverting input of amplifier 322, and to the non-inverting inputs of operational amplifiers 324 and 326. A chain of threshold voltages is developed for the other inputs of the operational amplifiers 322, 324, and 326 by serially connecting resistors 314, 316, 318, and 320 between the source of positive voltage +V and ground.

The threshold voltage developed between the junction of resistors 318 and 320 is applied to the inverting input of operational amplifier 326, while the threshold voltage developed between resistors 316 and 318 is applied to the inverting input of operational amplifier 324. Similarly, the threshold voltage developed between the junctions of resistors 314 and 316 is applied to the non-inverting input of operational amplifier 322. The outputs of amplifiers 322, 326 are pulled up by the resistor 328 and +V voltage, and the output of amplifier 330 is pulled up by resistor 330 and +V. Configured as described above, the operational amplifiers 322, 324, and 326 operate as digital comparators to provide logic levels for the control of two counters 336 and 338. When the output voltage at junction 307 is outside a range described by the threshold voltage for amplifier 326 and amplifier 322, the amplifiers will pull down the D input of a bistable 332 to a low logic level. This low logic level is clocked through the bistable to enable counter 336 to count one HORZ signal pulse applied to the CLK input of bistable 332. The counter 336 counts at the horizontal rate as long as the Q output of bistable 332 is at a low logic level.

The counter 336 is connected by its carry output CR to the clock enable input CE of counter 338. The counters 336 and 338 together form an 8-bit counter which accumulates clock pulses as long as the bistable 332 Q output is low. The direction in which the counters 336 and 338 count is determined by the output of a D-type bistable 334, which is clocked by the HORZ signal and which is set or reset by the logic level provided from the output of the comparator 324. The comparator 324 through its threshold voltage determines whether the voltage on junction 307 is higher or lower than the midpoint of the threshold range of comparators 322 and 326. The outputs of counters 336 and 338 are applied to the D0–D7 inputs of a D/A 340, and the $V_{out}$ output therefrom is applied to a non-inverting input of an operational amplifier 310 configured as a voltage follower. The operational amplifier 310 has its inverting input connected to its output, its non-inverting input coupled to +V voltage via a resistor 312, and provides a varying amount of current to junction 307 based on the voltage applied to its non-inverting input.

The output of the D/A 340 and voltage follower 310 in this manner attempts to null the voltage at junction 307, or at least bring it within the range between the two thresholds of amplifier 322 and 326. During the balancing, the counters accumulate a digital count representative of the voltage necessary for the balancing, that is, change the phase difference between the horizontal signal and subcarrier signal into a digital number. It may be seen that the combination of the comparators 322–326, bistables 332, 334, counters 336, 338, D/A 340 and voltage follower 310, together define a specific implementation of an analog-to-digital converter by way of example only, which corresponds to the A/D 46 in FIG. 2. Obviously, the combination of components may be replaced by a suitable A/D converter chip generally available.

In an advantageous feature, the digital number generated by counters 336, 338 indicative of the phase difference between horizontal and subcarrier signals, may be clocked into a latch 342 which has its D0–D7 inputs connected to the Q0–Q3 outputs of both counters 336 and 338. The system data bus 49 of previous mention in FIG. 2, is used to read the outputs Q0–Q7 of the latch 342 by applying the READ SCH PHASE signal to the output enable input *OE of the latch 342. The latch 342 is clocked at the vertical rate of the video signal by the timing control VERT signal to update the measurement of the horizontal sync to subcarrier phase relationship during only the vertical blanking interval.

Additionally, as previously mentioned, if a different phase centering than that provided for by the preset calibration of resistor 256 of the monostable 250 is desired, the system data bus 49 is used to write a corresponding 8-bit digital number into a latch 344. The number is supplied to the system bus from the video equipment 12, and is latched into the latch 344 by a WRITE SCH PHASE signal supplied to the CLK input of the latch 344. This allows a digital number input to occur asynchronously to the input video signal as in computer equipment. During the vertical blanking interval of the system, as indicated by the VERT signal, the digital control word from bus 49 is clocked into another latch 346. The output of latch 346 is applied to the D0–D7 inputs of a D/A 348, which corresponds to the D/A 42 of FIG. 2. The output of the D/A 348 is pulled up by resistors 350 and 352 and is used as the PHASE SET signal of previous mention in FIG. 2. The PHASE SET signal, which is a voltage corresponding to the digital word written into latch 346, is applied to the timing circuitry of the monostable 250 via the line 251 to change the bias of the monostable 250, and thus change accordingly the center or reference of the phase set point. Thus, instead of operating at a zero degree reference center as in a standard system, the reference center may be shifted a preselected angle which then becomes the new reference center about which the servo tracks. This new phase reference point is updated at the vertical rate as needed by clocking the latch 346 via the VERT signal.

The circuit tracks, or servos to, the input phase except when a RESET signal, a SCH INHIBIT signal, or a MEASURE signal is supplied as described above. The inhibiting of the tracking action, switching to the measuring mode, or switching to a reset mode, is selectively effected by two switches 166 and 268, which are connected in series with resistors 178 and 262 of FIGS. 7 and 8, respectively. The resistors shunt and thereby discharge the capacitors 176 and 270, respectively, of the tracking amplifiers 168 and 272 when the switches are closed. In the measurement mode the switches are closed, while in the tracking mode the switches are open as depicted in FIGS. 7,8.

Control of the switch 166 (FIG. 7) is provided by the output of a NAND gate 226, which forms part of the measure/track control circuit 52 of FIG. 2. When the NAND gate produces a low logic level output, the switch 166 is open and the system tracks, while a high output on the gate 226 closes switch 166 and inhibits the tracking process. The inputs to the NAND gate 226 are negative true, thus making the gate perform as a negative true input OR gate. The *SCH INHIBIT signal will thus close switch 166 as will the *Q output of a D-type bistable 220. The *SCH INHIBIT signal is also used to reset the bistable 220. The signal that causes a setting of the bistable 220 and thus, a closing of switch 166, is a high level RESET signal from the output of a NAND gate 212, coincident with the HORZ signal. This coincidence is detected in a NAND gate 216 which triggers a monostable 218 to provide a pulse to the D input of the bistable 220. This signal is clocked coincidently with the HORZ signal to become the SCH RESET signal at the Q output of the bistable 220. The combination of the *SCH INHIBIT signal and the *Q output of the bistable 220, closes the switch 166.

The output of the NAND gate 212 is a logic level indicating that the phase difference between the horizontal sync pulses and the subcarrier that is considerably out of bounds, for example over the range of ±360°, such that the servo tracking system must be be reset. This reset function is applied, via the bistable 220 and a line 281, as a SCH RESET signal to a monostable 282 (FIG. 8) which form part of the measure/track control circuit 52 of FIG. 2. The *Q pulse from monostable 282 travels through a NAND gate 294, provided that the gate is enabled. The SCH RESET pulse resets the tracking servo 50 by closing the switch 268, thus discharging capacitor 270 through resistor 262. The NAND gate 294 in turn is enabled by either of two signals. The SCH INHIBIT signal causes the closure of switch 268 by enabling gate 294 via an AND gate 292, as will the absence of the negative true logic signal MEASURE/TRACK coupled to the gate 294 via an inverter 290 and the gate 292.

In the measurement mode, the output of the operational amplifier 168 is a measure of the phase difference between the horizontal sync pulses and the subcarrier signal; that is, between the variable H sync signal from generator 40 and the phased subcarrier signal from the exclusive OR gate 34. A proportional part of that voltage is supplied to the comparator 54 (FIG. 2) and as shown here is used to feed the inputs of corresponding comparators, comprising operational amplifiers 188, 190, 192, and 194, through voltage dividers including resistors 184 and 186. The voltage is applied to the inverting inputs of operational amplifiers 188 and 190 and to the non-inverting inputs of operational amplifiers 192 and 194. A series of threshold voltages are developed by connecting in series resistors 196, 198, 200, 202, and 204 between a source of positive voltage +V and ground. The threshold voltage developed between resistors 196 and 198 is applied to the non-inverting input of operational amplifier 188, the threshold voltage developed between resistors 198 and 200 is applied to the non-inverting input of operational amplifier 190, the threshold voltage developed between resistors 200 and 202 is applied to the inverting input of operational amplifier 192, and the threshold voltage developed between the junction of resistors 202 and 204 is applied to the inverting input of operational amplifier 194.

The outputs of operational amplifiers 190 and 192 are connected together at a pull up resistor 208, whose other terminal is connected to the source of positive voltage +V. The operational amplifiers 190 and 192 form comparators which provide a high level output signal if the phase difference voltage is not within the range of ±40°. This output signal may be inhibited in NAND gate 214 by the *SCH INHIBIT signal when the input video signal is a monochrome signal. The logic level from NAND gate 214 is used to indicate to an operator whether or not the signal input is within the RS 170A specification when the system is in the measurement mode. Comparators 188 and 194, whose outputs are pulled up by a resistor 206 and +V, and a resistor 210 and +V, respectively, have a greater range and determine whether or not the signal is within, for example, a ±360° phase range, when in the measurement mode. If the signal is outside the limits, the NAND gate 212 provides a low level signal corresponding to the RESET signal.

While a preferred embodiment of the invention has been illustrated, it will be obvious to those skilled in the art that various modifications and changes may be made thereto without departing from the spirit and scope of the invention as defined in the appended claims. For example, the invention may be used in a system wherein there are two noncoherent signals and it is desirable that one signal track the other. In such a situation, the reset at the wide range of ±360° is removed to allow the circuit to servo the signals.

The invention further may be used in a component television signal system to locate field 1 of the composite signal and generate timing signals required in video recorders, time base correctors or encoders of component systems in associated video apparatus.

What is claimed is:

1. A circuit for tracking the subcarrier-to-horizontal sync phase of an input video signal having a horizontal sync signal, comprising:
   means for providing from the input video signal a horizontal sync-related subcarrier signal whose phase is the same from line to line;
   means for generating from the input video signal a horizontal pulse with controllable time delay commensurate with time variations in the horizontal sync signal;
   means responsive to the providing and generating means for supplying a servo voltage indicative of a phase difference between the horizontal sync-related subcarrier signal of constant phase and the horizontal pulse of controllable time delay; and
   loop mean coupling the supplying means to the generating means, for varying the controllable time delay of the horizontal pulse in response to the servo voltage to reduce said phase difference to zero, and to servo the circuit so that it tracks the subcarrier-to-horizontal sync phase.

2. A circuit for tracking the subcarrier-to-horizontal sync phase of an input video signal, comprising;
   means for providing from the input video signal a horizontally-related subcarrier signal;

means for generating from the input video signal a horizontal pulse with selectable delay representing a variable horizontal sync signal;

means responsive to the providing and generating means for supplying a servo voltage indicative of a phase difference between the subcarrier signal and the horizontal pulse of selectable delay;

wherein the supplying means includes; phase comparator means coupled to receive the subcarrier pulse and the horizontal pulse, for supplying a phase difference signal indicative of the phase difference; and phase measurement means for generating the servo voltage with a selected transfer function in response to the phase difference signal said circuit further comprising;

loop means for varying the selectable delay of the horizontal pulse in response to the servo voltage to reduce said phase difference to zero, and to servo the circuit so that it tracks the subcarrier-to-horizontal sync phase.

3. The circuit of claim 2 including:
a system data bus; and
means coupled to the phase measurement means for reading out therefrom a digital number corresponding to the phase difference to the system data bus.

4. The circuit of claim 2 wherein:
said generating means includes variable pulse width generator means coupled to the loop means for generating in response to the servo voltage, a variable trailing edge on the horizontal pulse indicative of the selectable delay; and
said variable pulse width generator means includes bias means responsive to the servo 5. The circuit of claim 4 wherein the bias means includes bias pre-setting means formed of a variable potentiometer.

6. The circuit of claim 4 wherein the bias means includes bias pre-setting means including:
means for supplying a digital number which represents a desired non-standard subcarrier-to-horizontal sync phase of operation; and
converter means coupled to the digital number supplying means for selectively pre-setting the bias means to the desired non-standard.

7. The circuit of claim 4 wherein the loop means includes:
tracking servo means coupled to the phase measurement means, for selectively varying the servo voltage supplied to the bias means in response to the phase difference signal.

8. The circuit of claim 7 wherein said tracking servo means includes:
an operational amplifier; and
switch means coupled to the operational amplifier for enabling same when the circuit is tracking the input video signal.

9. The circuit of claim 7 wherein the circuit is operable in measurement, tracking and reset modes, further including:
first switch means coupled to the phase measurement means;
second switch means coupled to the tracking servo means; and
control circuit means coupled to the first and second switch means for selectively closing and opening same in response to the circuit being in the measurement, tracking or reset mode of operation.

10. The circuit of claim 4 wherein:
said phase comparator means is a bistable circuit;
said phase measurement means is an operational amplifier; and
said variable pulse width generator means includes a monostable circuit responsive to the bias means.

11. The circuit of claim 4 including:
voltage comparator means coupled to the phase measurement means and responsive to the servo voltage for providing an input video standard signal indicative of whether the phase difference is less than, or greater than, the standard subcarrier-to-horizontal sync phase, and to provide a reset signal if the phase difference is greater than a selected non-standard maximum limit of subcarrier-to-horizontal sync phase.

12. The circuit of claim 11 further including:
control circuit means responsive to the reset signal for re-setting the circuit when the subcarrier-to-horizontal sync phase drifts beyond the selected maximum limit.

13. The circuit of claim 4 including:
means for inverting the horizontally-related subcarrier signal; and
timing circuit means for supplying a video reference signal in response to receiving the inverted horizontally-related subcarrier signal from the inverting means and the variable trailing edge of the horizontal pulse from the generating means.

14. The circuit of claim 4 wherein:
the loop means includes tracking servo means for supplying the servo voltage to the bias means;
the bias means includes means for pre-setting the bias thereof; and
the tracking servo means changes the bias in response to the servo voltage to steer the variable trailing edge into coincidence with the subcarrier pulse and cause the circuit to track the subcarrier-to-horizontal sync phase of the input video signal.

15. The circuit of claim 4 including:
a system data bus;
means for supplying a digital number to the system data bus which represents a desired non-standard subcarrier-to-horizontal sync phase of operation; and
converter means coupling the system data bus to the variable pulse width generator means, for selectively pre-setting the bias means to the desired non-standard.

16. The circuit of claim 4 including:
voltage comparator means coupled to the phase measurement means and responsive to the servo voltage, for providing an input video standard signal indicative of whether the phase difference is within the range of a standard subcarrier-to-horizontal sync phase, and to provide a reset signal when the phase difference drifts beyond a selected non-standard maximum limit of subcarrier-to-horizontal sync phase.

17. The circuit of claim 16 including:
control circuit means coupled to the voltage comparator means for re-setting the circuit in response to the reset signal when the subcarrier-to-horizontal sync phase of the input video signal drifts beyond the selected maximum limit.

18. The circuit of claim 16 wherein:
the phase measurement means includes a measurement operational amplifier, and a first shunting switch means coupled to the measurement operational amplifier;

the loop means includes a tracking operational amplifier coupled to the phase measurement means, and a second shunting switch means coupled to the tracking operational amplifier; and control circuit means coupled to the voltage comparator means for closing the first and second shunting switch means in response to the reset signal to reset the circuit.

19. A circuit for tracking the subcarrier-to-horizontal sync phase of an input color video signal having a horizontal sync signal, and for supplying a video reference signal which identifies the start of active video in a horizontal line of the color video signal, comprising:

means for providing a horizontal sync-related subcarrier signal;

means for generating a pulse signal initiated at a time synchronous with the horizontal sync signal and ending as a trailing edge at a controllable variable time;

means for comparing the horizontal sync-related subcarrier signal with the trailing edge of the pulse signal to determine whether the trailing edge leads or lags the subcarrier signal; and means coupled to the generating means and responsive to the comparing means, for advancing the trailing edge of the pulse signal if it lags the subcarrier signal, or for retarding the trailing edge if it leads the subcarrier signal, to cause the pulse signal to track phase variations in the input color video signal.

20. The circuit of claim 19, including:

means for inverting the horizontal sync-related subcarrier signal;

timing circuit means for supplying the video reference signal in response to time coincidence between the inverted horizontal sync-related subcarrier signal and the steered trailing edge of the pulse signal.

21. The circuit of claim 19 wherein:

the comparing means supplies a phase difference signal indicative of whether the trailing edge of the pulse signal leads or lags the subcarrier signal and of the phase difference therebetween;

phase measurement means coupled to the comparing means for generating a difference voltage with a selected transfer function in response to the phase difference signal; and servo means coupled to the phase measurement means for supplying a servo voltage, commensurate with the selected transfer function, to the advancing or retarding means.

22. The circuit of claim 21 wherein:

the advancing or retarding means includes variable pulse width generator means for changing the timing of the trailing edge of the pulse signal in response to the servo voltage.

23. The circuit of claim 22 wherein the variable pulse width generator means includes a bias network for changing the bias thereof in response to the servo voltage, said bias network including means for pre-setting the bias thereof to a selected subcarrier-to-horizontal sync phase setting.

24. A circuit for tracking the subcarrier to horizontal sync phase of an input video signal and for supplying a video reference signal which identifies the start of the active video in a horizontal line, comprising:

means for supplying a horizontal signal which is locked to the subcarrier;

means for providing a horizontal sync-related subcarrier signal in response to the supplying means;

means for generating a variable horizontal sync signal having a trailing edge variable in time;

means for measuring the phases of the horizontal sync-related subcarrier signal and of the variable horizontal sync signal and for supplying a difference voltage indicative of the phase difference between the signals;

servo means coupled to the measuring means for supplying a servo voltage representative of the phase difference voltage;

said generating means including means for varying the timing of the trailing edge in response to the servo voltage to steer the trailing edge into coincidence with the horizontal sync-related subcarrier signal; and timing circuit means for generating said video reference signal in response to the steered trailing edge being in time coincidence with the horizontal sync-related subcarrier signal.

25. The circuit of claim 24 wherein:

the timing circuit means includes bistable multivibrator means, and means for supplying an inverted horizontally-related subcarrier signal thereto; and the generating means includes monostable multivibrator means which is enabled by the horizontal signal, and disabled to generate the time variable trailing edge in response to the servo voltage.

26. The circuit of claim 24 wherein the servo means includes:

means for indicating a tracking mode of operation; and operational amplifier means, coupled to the measuring means and responsive to the difference voltage, for supplying the servo voltage to the varying means during the tracking mode.

27. The circuit of claim 24 wherein the generating means includes:

monostable circuit means for generating a pulse whose leading edge is initiated by the horizontal signal, and whose trailing edge is initiated by the varying means in response to the servo voltage.

28. A method for tracking a drifting subcarrier-to-horizontal sync phase of an input video signal, wherein the video signal includes a subcarrier component and a horizontal sync signal, comprising:

providing a horizontal sync-related subcarrier signal whose phase is the same from line to line relative to horizontal sync;

generating a horizontal signal with a controllable time delay indicative of said drifting subcarrier to horizontal sync phase;

supplying a voltage signal which represents the difference in phase between the horizontal sync-related subcarrier signal and the horizontal signal; and varying the controllable time delay of the horizontal signal in response to the voltage signal to drive the time of ocurrence of the horizontal signal into coincidence with the time of occurrence of the horizontal sync-related subcarrier signal.

29. The method of claim 28 wherein the step of supplying includes:

comparing the phase of the horizontally-related subcarrier signal with the phase of the horizontal sync signal;

measuring the difference in phase between the two signals; and supplying the voltage signal in response to the difference in phase measurement.

30. The method of claim 29 including:

indicating whether the phase difference between the horizontal sync-related subcarrier signal and the horizontal sync signal is within or beyond a selected standard time window.

31. The method of claim 29 wherein the step of varying includes:

generating a time variable edge to represent the horizontal sync signal timing;

changing the time of occurrence of the time variable edge in response to the voltage signal until the phase difference between the two signals is zero.

32. The method of claim 31 including:

pre-setting the time of occurrence of the time variable edge; and applying the voltage signal to further vary the pre-set time of occurrence of the time variable edge until said phase difference is zero.

33. The method of claim 31 including:

generating a video reference signal which tracks in time the drifting subcarrier-to-horizontal sync phase in response to the horizontal sync-related subcarrier signal being in time coincidence with the time variable edge of the horizontal sync signal.

34. The method of claim 33 further including:

generating a reset signal for re-starting the steps of the method in response to the subcarrier-to-horizontal sync phase drifting beyond a predetermined maximum time window.

* * * * *